United States Patent
Aggarwal et al.

(10) Patent No.: US 7,475,085 B2
(45) Date of Patent: Jan. 6, 2009

(54) METHOD AND APPARATUS FOR PRIVACY PRESERVING DATA MINING BY RESTRICTING ATTRIBUTE CHOICE

(75) Inventors: Charu C. Aggarwal, Mohegan Lake, NY (US); Nagui Halim, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 11/397,297

(22) Filed: Apr. 4, 2006

(65) Prior Publication Data

US 2007/0233711 A1 Oct. 4, 2007

(51) Int. Cl.
*G06F 17/30* (2006.01)
(52) U.S. Cl. ............... 707/101; 707/1; 707/2; 707/9; 707/100; 707/103 R
(58) Field of Classification Search .......... 707/1, 707/2, 9, 100–103 R
See application file for complete search history.

(56) References Cited

OTHER PUBLICATIONS

Oliveira et al, Privacy Preserving Frequent Itemset Mining, Sep. 16, 2003, p. 1-12.*
R.J. Bayardo et al., "Data Privacy Through Optimal k-Anonymization," Proceedings of the ICDE Conference, pp. 217-228, 2005.
C.C. Aggarwal et al. "A Condensation Based Approach to Privacy Preserving Data Mining," Proceedings of the EDBT Conference, 18 pages, 2004.
R. Aggarwal et al., "Privacy-Preserving Data Mining," Proceedings of the ACM SIGMOD Conference, pp. 12 pages, 2000.
K. Beyer et al., "When is 'Nearest Neighbor' Meaningful?," Proceedings of the ICDT Conference, pp. 1-10, 1999.
A. Evfimievski et al., "Privacy Preserving Mining of Association Rules," ACM KDD Conference, 12 pages, 2002.
P. Samarati et al., "Protecting Privacy When Disclosing Information: k-Anonymity and its Enforcement Through Generalization and Suppression," Proceedings of the IEEE Symposium on Research in Security and Privacy, pp. 1-19, May 1998.

* cited by examiner

*Primary Examiner*—Cam-Linh Nguyen
(74) *Attorney, Agent, or Firm*—Ryan, Mason & Lewis, LLP

(57) ABSTRACT

Improved techniques for privacy preserving data mining of multidimensional data records are disclosed. For example, a technique for generating at least one output data set from at least one input data set for use in association with a data mining process comprises the following steps/operations. At least one relevant attribute of the at least one input data set is selected through determination of at least one relevance coefficient. The at least one output data set is generated from the at least one input data set, wherein the at least one output data set comprises the at least one relevant attribute of the at least one input data set, as determined by use of the at least one relevance coefficient.

21 Claims, 5 Drawing Sheets

METHOD AND APPARATUS FOR PRIVACY PRESERVING DATA MINING BY RESTRICTING ATTRIBUTE CHOICE

This invention was made with Government support under Contract No. H98230-4-03-0001 awarded by the U.S. Dept. of Defense. The Government has certain rights in this invention.

FIELD OF THE INVENTION

The present invention relates generally to privacy preserving data mining and, more particularly, to condensing a multidimensional data set and preserving statistical information regarding the multidimensional data set in order to create an anonymized data set.

BACKGROUND OF THE INVENTION

In recent years, the wide availability of personal data has made the problem of privacy preserving data mining an important one. For instance, it is known that vast amounts of personal data about individuals are stored at different commercial vendors and organizations in the form of multidimensional data records. In many cases, users are willing to divulge information about themselves only if the privacy of the data is guaranteed. Thus, methods are needed to mask the sensitive information in these records.

A number of methods have been proposed for privacy preserving data mining of multidimensional data records. One method of preserving privacy in accordance with such data mining operations is known as anonymization, wherein a record is released only if it is indistinguishable from k other entities in the data.

Anonymization requires a high degree of spatial locality for effective and statistically robust implementation. In high dimensional space, the data becomes sparse and the concept of spatial locality is no longer easy to define from an application point of view. When the data contains a large number of attributes which may be considered quasi-identifiers, it becomes difficult to anonymize the data without an unacceptably high amount of information loss. This is because an exponential number of combinations of dimensions can be used to make precise inference attacks, even when individual attributes are partially specified within a range.

Accordingly, there is a need for improved techniques for privacy preserving data mining of multidimensional data records.

SUMMARY OF THE INVENTION

Principles of the invention provide improved techniques for privacy preserving data mining of multidimensional data records.

For example, in one aspect of the invention, a technique for generating at least one output data set from at least one input data set for use in association with a data mining process comprises the following steps/operations. At least one relevant attribute of the at least one input data set is selected through determination of at least one relevance coefficient. The at least one output data set is generated from the at least one input data set, wherein the at least one output data set comprises the at least one relevant attribute of the at least one input data set, as determined by use of the at least one relevance coefficient.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
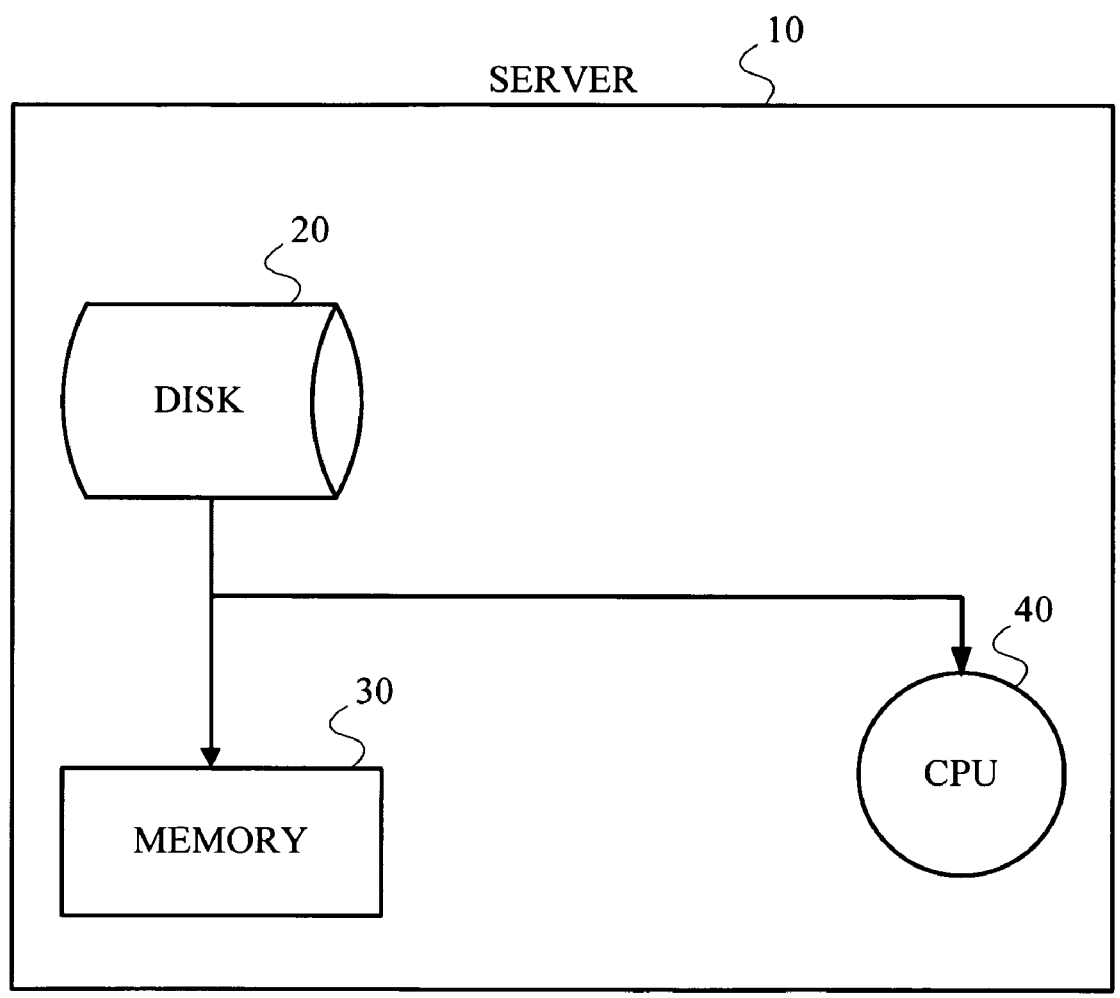
FIG. 1 is a block diagram illustrating a hardware implementation suitable for employing one or more privacy preserving data mining methodologies, according to an embodiment of the present invention.

The following description will illustrate the invention using an exemplary data processing system architecture. It should be understood, however, that the invention is not limited to use with any particular system architecture. The invention is instead more generally applicable to any data processing system in which it is desirable to perform efficient and effective privacy preserving data mining.

Further, the phrase "data point" (or point) is used herein interchangeably with the phrase "data record" (or record). By way of example only, in a demographic data set, a data point could refer to one or more attributes of an individual. For example, a data point could refer to a record containing age, sex, and/or salary, etc., wherein each attribute (age, sex, etc.) can be referred to as a "dimension" of the record. However, the invention is not limited to these particular types of data points, data records, or dimensions.

In accordance with an illustrative embodiment of the invention, a privacy preserving data mining approach that improves upon the k-anonymity and the k-indistinguishability approaches is described.

The k-anonymity approach is disclosed, for example, in P. Samarati et al., "Protecting Privacy When Disclosing Information: k-Anonymity and its Enforcement Through Generalization and Suppression," Proceedings of the IEEE Symposium on Research in Security and Privacy, May 1998, for the high dimensional case. A main idea behind the k-anonymity class of approaches is that many of the fields in the data can be treated as pseudo-identifiers or quasi-identifiers which can be matched with publicly known data in order to identify individuals. For example, a commercial database containing birthdates, gender and zip-codes can be matched with voter registration lists in order to identify the individuals precisely. Another related class of methods to deal with the issue of k-anonymity is the k-indistinguishability approach. The k-indistinguishability approach is disclosed, for example, in C. C. Aggarwal et al. "A Condensation Based Approach to Privacy Preserving Data Mining," Proceedings of the EDBT Conference, pp. 183-199, 2004. The k-anonymity and k-indistinguishability approaches are briefly explained below.

In the k-anonymity approach, generalization techniques are applied in order to mask the exact values of attributes. For example, a quantitative attribute such as the age may only be specified to a range. This is referred to as attribute generalization. By defining a high enough level of generalization on each attribute, it is possible to guarantee k-anonymity. On the other hand, attribute generalization also leads to a loss of information.

In the k-indistinguishability approach, clustering techniques are used in order to construct indistinguishable groups of k records. The statistical characteristics of these clusters are used to generate pseudo-data which are used for data mining purposes. While such pseudo-data do not represent the true data records, it is useful for most modeling purposes, since it reflects the original distribution of the records. There are some advantages in the use of pseudo-data, in that it is more resistant to hacking, and it does not require any modification of the underlying data representation as in a generalization approach.

While the k-anonymity and k-indistinguishability model differ in the final anonymized data representation, they are similar in methodology and concept. For example, both the approaches are aimed to thwart the case where an inference driven user may use a combination of attributes in order to infer the identity of the individual record. It is to be understood that the term "anonymization," as used herein to describe illustrative embodiments of the invention, encompasses both k-anonymity and k-indistinguishability, as well as any other functionally, conceptually, and/or methodologically similar technique for preventing one from inferring the identity of an individual record, regardless of the form or content of the final anonymized data representation generated by such a technique. Typical anonymization approaches assume that only a small number of fields which are available from public data are used as quasi-identifiers. These methods assume that these publicly defined fields are well studied from a domain specific point of view and use generalizations on corresponding domain hierarchies of this small number of fields.

These hierarchies are used to construct privacy preserving generalizations of the data set. While such solutions are useful for the case of small subsets of quasi-identifiers, they cannot be used effectively in the high dimensional case. In general, a quasi-identifier may not be derived from a public database, but may be any field which is partially or substantially known to any particular group or entity (such as an employer). In such cases, the number of combinations of dimensions available for inference attacks increases rapidly and also makes the data more challenging for the privacy preservation process. It will be evident that inter-attribute combinations within a record have such a powerful revealing effect in the high dimensional case that the amount of data required to preserve anonymity increases beyond most practical limits.

For ease in illustration, it will be assumed that any dimension in the database is a potentially identifying quasi-identifier. This assumption can be made without loss of generality, since analysis can be restricted only to such identifying attributes. A further assumption is the use of quantitative attributes. This assumption can also be made without loss of generality. The results can be easily extended to categorical data, since both the quantitative and categorical data domains can be represented in binary form.

It is to be noted that anonymization techniques depend upon some notion of spatial locality in order to perform the generalization. This spatial locality is often defined in the form of a distance function. However, distance functions begin to show loss of intra-record distinctiveness in high dimensional space. It has been argued that under certain reasonable assumptions on the data distribution, the distances of the nearest and farthest neighbors to a given target in high dimensional space is almost the same for a variety of data distributions and distance functions. In such a case, the concept of spatial locality becomes ill defined, since the contrasts between the distances to different data points do not exist. Generalization-based approaches to privacy preserving data mining are deeply dependent upon spatial locality, since they use the ambiguity of different data points within a given spatial locality in order to preserve privacy. Thus, privacy preservation by anonymization becomes impractical in very high dimensional cases, since it leads to an unacceptable level of information loss.

As will be illustratively described herein, one aim of the data mining methodologies of the invention is to preserve only a small number of attributes. Specifically, the attributes which are preserved are the attributes most useful to the data mining problem at hand. This ensures that the privacy is preserved without losing the relevant features for that specific instance. It is desirable to use this kind of approach in the high dimensional case because only a small number of features can be used. Therefore, only the attributes which are relevant for that particular application are retained. This optimizes the choice of entries which are removed for privacy preservation purposes. It is also possible to modify the anonymization procedure so that only the entries which are the most relevant to the particular application are used.

Referring initially to FIG. 1, a block diagram illustrates a hardware implementation suitable for employing one or more privacy preserving data mining methodologies, according to an embodiment of the present invention. As shown, a server 10 includes a disk 20, main memory 30 and a central processing unit (CPU) 40.

In this illustrative embodiment, disk 20 stores an original version of a data set and a transformed version of the data set. The original data may be received from any source or sources (e.g., one or more client devices connected to the server over a network). In one embodiment, the original data set may include data records obtained from customer interaction with a commercial vendor website. The original data set is processed by CPU 40 in order to transform it for privacy preservation purposes. That is, one or more of the methodologies described herein may be applied to the original data set in order to form a transformed (or privacy-preserved) data set. In addition, main memory 30 is used by the processor in performing the steps of the methodologies.

Further, software components including instructions or code for performing the methodologies of the invention, as described herein, may be stored in one or more memory devices described above with respect to the server and, when ready to be utilized, loaded in part or in whole and executed by the CPU.

Figure 2:
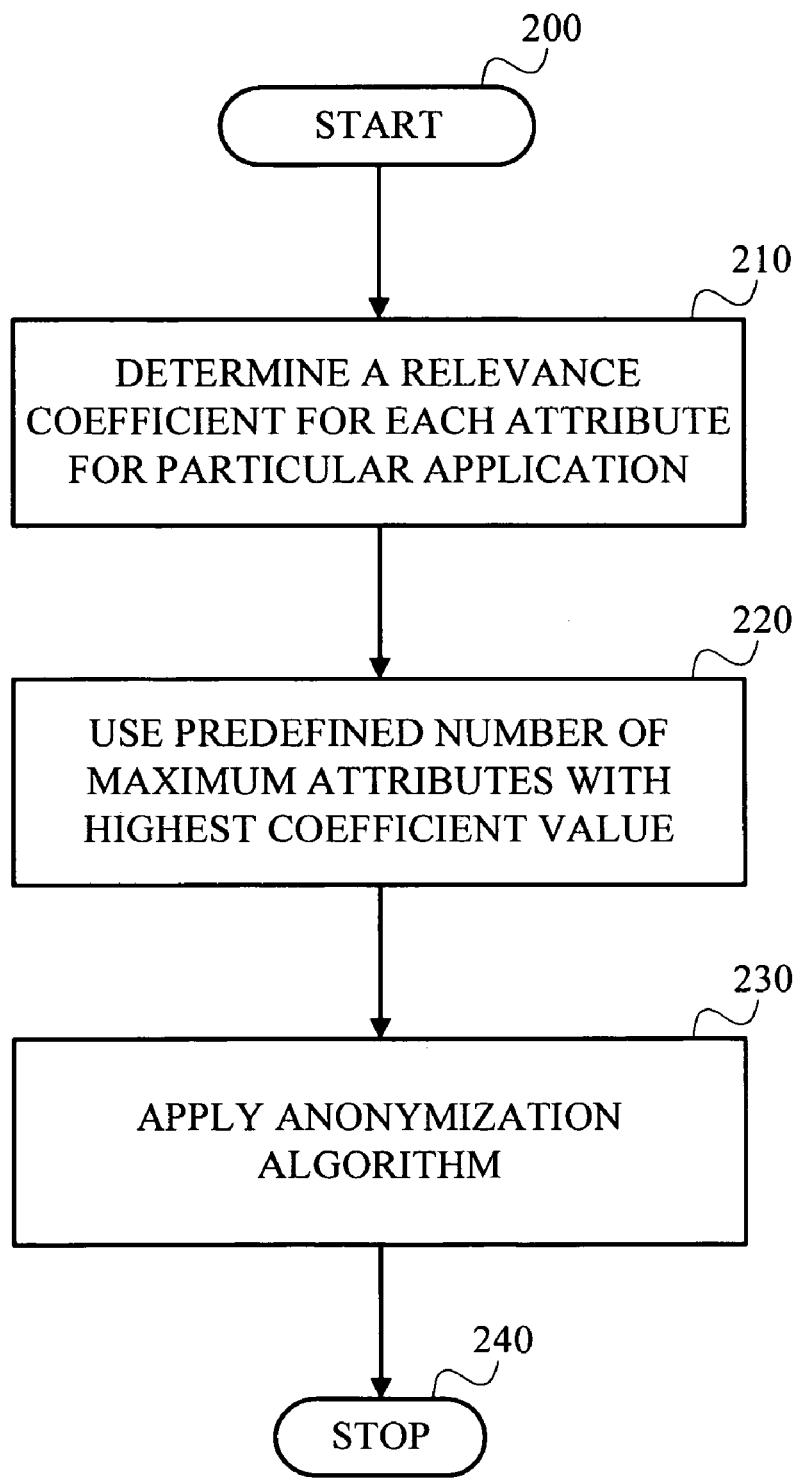
FIG. 2 is a flow diagram illustrating a privacy preserving data mining methodology using global attribute selection, according to an embodiment of the present invention.

Referring now to FIG. 2, a flow diagram illustrates a privacy preserving data mining methodology using global attribute selection, according to an embodiment of the present invention. More particularly, FIG. 2 illustrates a global method for feature selection for a particular privacy preserving data mining application.

The methodology starts at block 200. As shown, step 210 determines a relevance coefficient for each attribute for a particular application. This relevance coefficient may be defined in a different way for each application. For example, in the case of a classification application, the relevance coefficient may be defined in terms of the level of correlation of the class variable with the feature variable. In the case of a regression application, in which the class variable is quantitative, one can use the statistical correlation between the feature and class variable. When the class variable is categorical, one can use the gini index in order to define the level of discrimination provided by the feature variable. For example, the gini index is defined as follows.

A fraction f of the records is isolated in which a particular feature variable with the highest value. This fraction f may typically be equal to 0.5. Within this fraction, the distribution of the k classes is determined. Assume that among these records, the fraction of the k classes is denoted by $p(1) \ldots p(k)$. In this case, the gini index is defined as $$\sum_{i=1}^{k} p(i)^2.$$

Note that this value always lies between zero and one. The greater the skew in class distribution, the higher the gini index. In such cases, that feature variable has higher relevance to the class attribute.

It is to be noted that a user may have considerable flexibility in defining the coefficient in any way depending upon the nature of the underlying application. For example, for the case of the classification application, a user may also use the entropy as a representation of the effectiveness of a particular feature variable. It is also to be noted that the nature of the attributes used also depends upon the application at hand. For example, in the case of a clustering application, it may be useful to utilize features which maximize the ratio of inter-cluster to intra-cluster distances. In many cases, the nature of the coefficients chosen may depend upon the skill of the end user of the data mining application.

In the next step, the user may choose to keep only a pre-defined number of features with the highest coefficient. This is achieved in step 220. Once this has been done, any anonymization algorithm can be applied in order to perform the transformation of the data. Many anonymization algorithms, such as those disclosed in the above-referenced C. C. Aggarwal et al. ("A Condensation Based Approach to Privacy Preserving Data Mining," Proceedings of the EDBT Conference, pp. 183-199, 2004) and P. Samarati et al. ("Protecting Privacy When Disclosing Information: k-Anonymity and its Enforcement Through Generalization and Suppression," Proceedings of the IEEE Symposium on Research in Security and Privacy, May 1998) articles, are available for this purpose. Any of these algorithms can be used for this step. This is done in step 230. The resulting data is the transformed data which uses a reduced number of features, but chooses them effectively for the particular data mining application. In many cases, the level of sensitivity of the fields may also vary depending upon the application at hand. In such cases, it is possible to appropriately weight the underlying features for the data mining application. The methodology ends at block 240.

The technique described in the context of FIG. 2 uses global feature selection as a prelude to anonymization transformations. In many cases, it may be desirable to only suppress some of the entries for anonymization purposes. For different records, the level of importance of the different fields may be quite different. It is this fact which is used to leverage the effectiveness of the approach. This is achieved by the methodology shown in FIG. 3.

Figure 3:
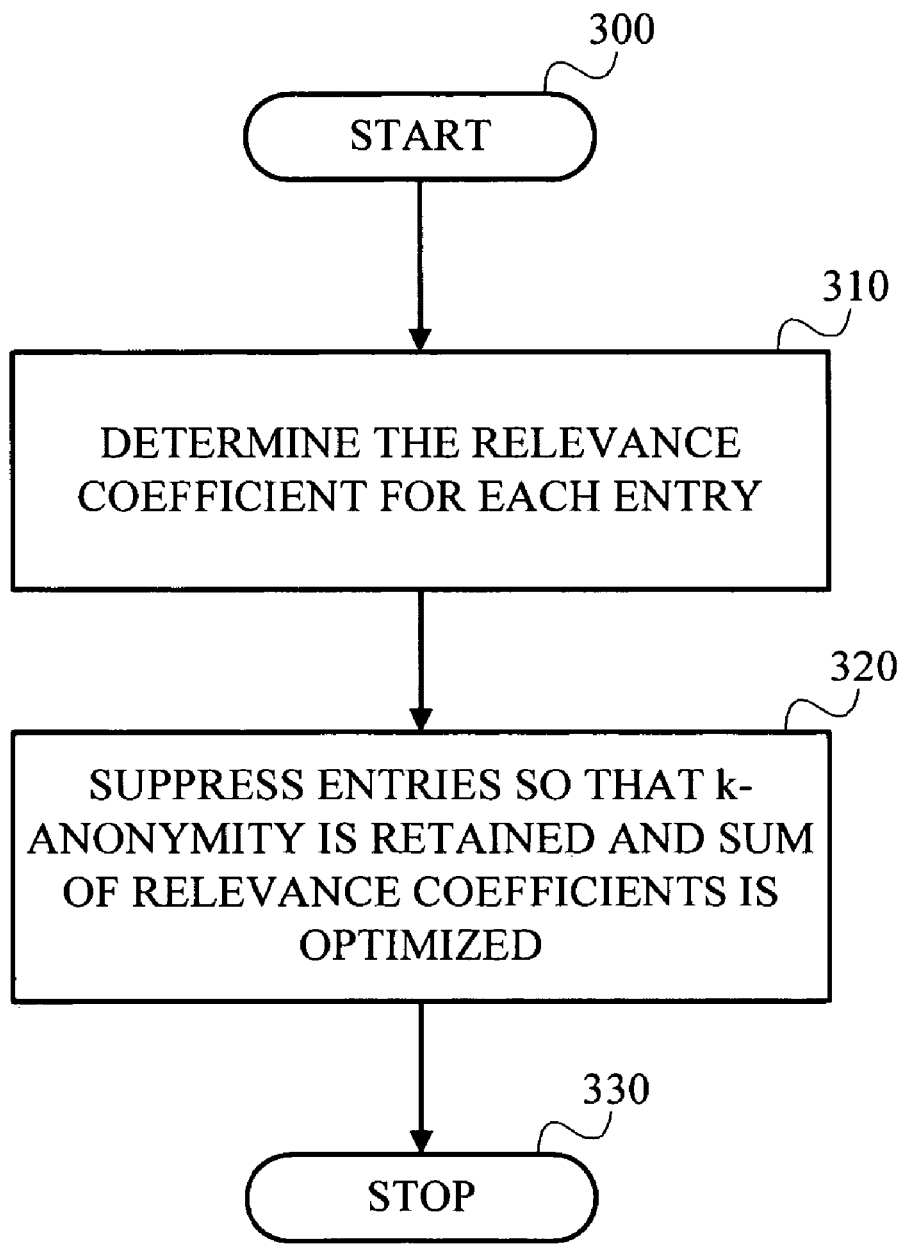
FIG. 3 is a flow diagram illustrating a privacy preserving data mining methodology using local attribute selection, according to an embodiment of the present invention.

Referring now to FIG. 3, a flow diagram illustrates a privacy preserving data mining methodology using local attribute selection, according to an embodiment of the present invention. The methodology begins at block 300. Step 310 determines the relevance coefficient for each entry. The method for computing the relevance coefficient depends upon the particular data mining problem at hand. For example, for the case of a classification application, the relevance coefficient may be defined as the reduction in classification accuracy when an entry from the data is deleted.

It is to be noted that the use of a classification model with missing entries will typically have lower accuracy than one in which all the entries are present. For different applications, the relevance coefficients may be defined differently. As in the previous case, the choice of a particular coefficient is dependent upon the skills of the end user. Once the relevance coefficients of the different entries have been determined, a suppression algorithm is applied so that anonymization is preserved. This step is accomplished in step 320. This step will be described in more detail below. The methodology ends at block 330.

Figure 4:
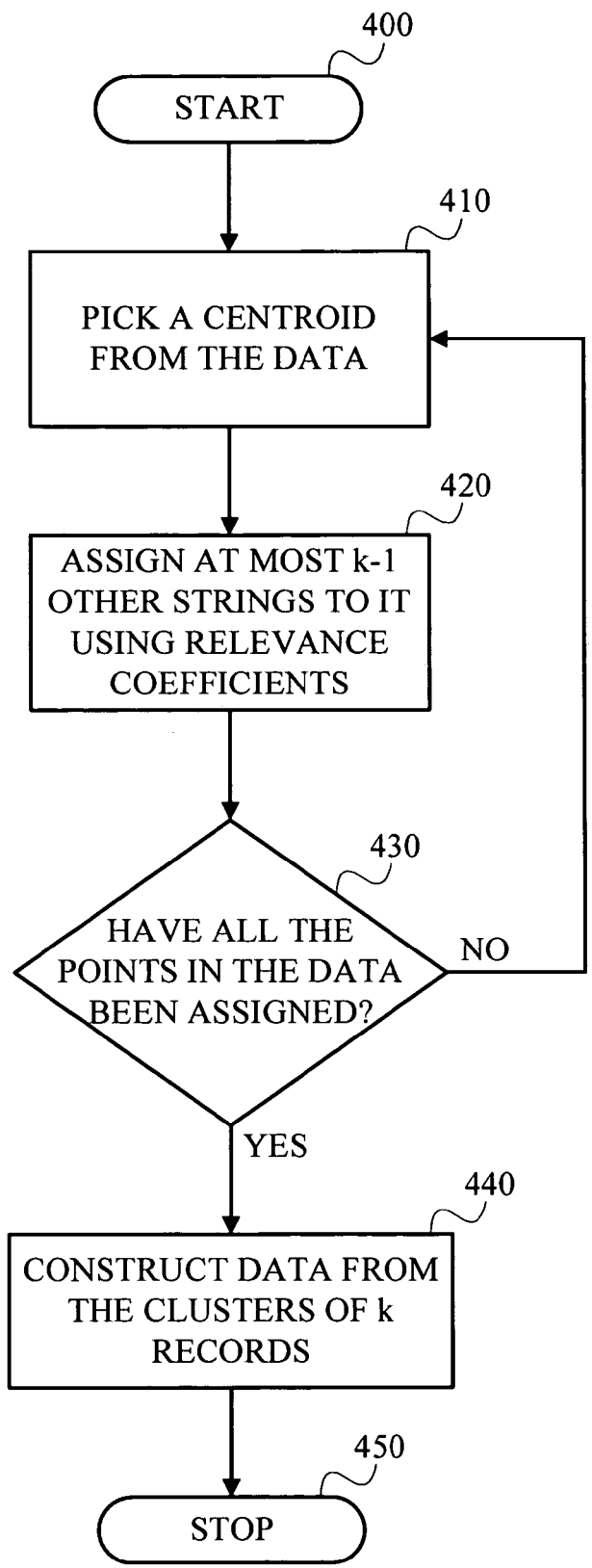
FIG. 4 is a flow diagram illustrating a methodology for achieving anonymization of a static database of records using the relevance coefficients of the individual entries, according to an embodiment of the present invention.

Referring now to FIG. 4, a flow diagram illustrates a methodology for achieving anonymization of a static database of records using the relevance coefficients of the individual entries, according to an embodiment of the present invention. More particularly, FIG. 4 illustrates a process of achieving k-anonymity with the use of relevance coefficients of different entries. The idea in this case is to use a distortion which is proportionate to the relevance level of that entry. In order to achieve this goal, clusters of points containing k records each are created. However, during the process of cluster creation, the entries are not weighted equally.

Specifically, an entry is weighted by a function of the corresponding relevance coefficient. The overall approach of anonymization creates clusters, by repeatedly picking records from the data and assigning closest points to them. The methodology begins at block 400. In step 410, a point is selected from the data. This point will serve as the centroid for a cluster. In step 420, the methodology assigns the k−1 closest records to the selected point (centroid), using a pre-defined distance function, thus forming a cluster. More than one cluster may be formed in this manner. In addition, statistics associated with each cluster are stored. The statistics for each cluster may be as follows:

(1) For each pair of dimensions, the sum of the product of pairs of dimensions is stored.

(2) For each dimension, the sum of the corresponding values on that dimension is stored.

(3) The number of points in that cluster is stored.

It is to be noted that each of the above-mentioned statistics can be expressed in an additive way over the different points. As a result, this facilitates updating of the statistics, even in the dynamic case which will be described below.

The distance function for computing the proximity of data points to cluster centroids uses the relevance coefficients of the entries. For each assigned data point, the methodology weights a feature variable by a function of the relevance coefficient. The nature of this function may also vary depending upon the underlying application. This process is repeated for new points picked as centroids, until all points have been assigned. Once all points have been assigned (step 430), the methodology generates pseudo-data from the statistics of these records (step 440). As mentioned above, the statistics of each cluster are pre-stored during the privacy transformation process.

The statistics can be used to generate the directions of zero correlation. The pseudo-data can be generated along these directions by computing the variance along these directions, and generating the data independently along these directions with this variance.

More particularly, by way of example, pseudo-data may be generated as follows. For each group, the statistics to covariance matrix of each group is used. It is to be noted that the covariance of each group can be computed in terms of the first and second order statistics. Recall that the second order statistics is stored in terms of the sum of the product of pairs of dimensions, and the first order statistics are stored as the sum along a given dimension. Let $Sc(i,j)$ denote the second order statistics for dimension pair $(i, j)$. Let $Fs(i)$ denote the first order statistics for dimension i, and n denote the number of points in a group.

Then, the covariance $C(i,j)$ between the dimensions i and j is defined as $C(i,j)=Sc(i,j)/n-Fs(i)*Fs(j)/(n*n)$. The covariance for every pair of dimensions i and j is calculated. Let the resulting d*d covariance matrix be denoted by C, where d is the total number of dimensions.

It is to be noted that this matrix C is positive semi-definite and can be diagonalized as follows: $C=P'\cdot D\cdot P$ Here P' denotes the transpose of P, and D is a diagonal matrix. The columns of P represent the eigenvectors of the covariance matrix C, and the diagonal matrix D represents the eigenvalues. The eigenvectors represent an orthonormal axis system along which the data can be transformed. The eigenvalues represent the variances along these eigenvectors.

One property of this set of eigenvectors is that the underlying data, when represented along this axis system, shows second order independence. Therefore, samples can be re-generated independently along these axis directions. Specifically, the uniform distribution along these axis directions is used in order to re-generate the samples. While this is an approximation, it turns out to be quite effective as long as it is done locally within a group. In most cases, the global distribution of the synthetically generated pseudo-data matches the original data quite effectively.

The methodology ends at block 450.

Figure 5:
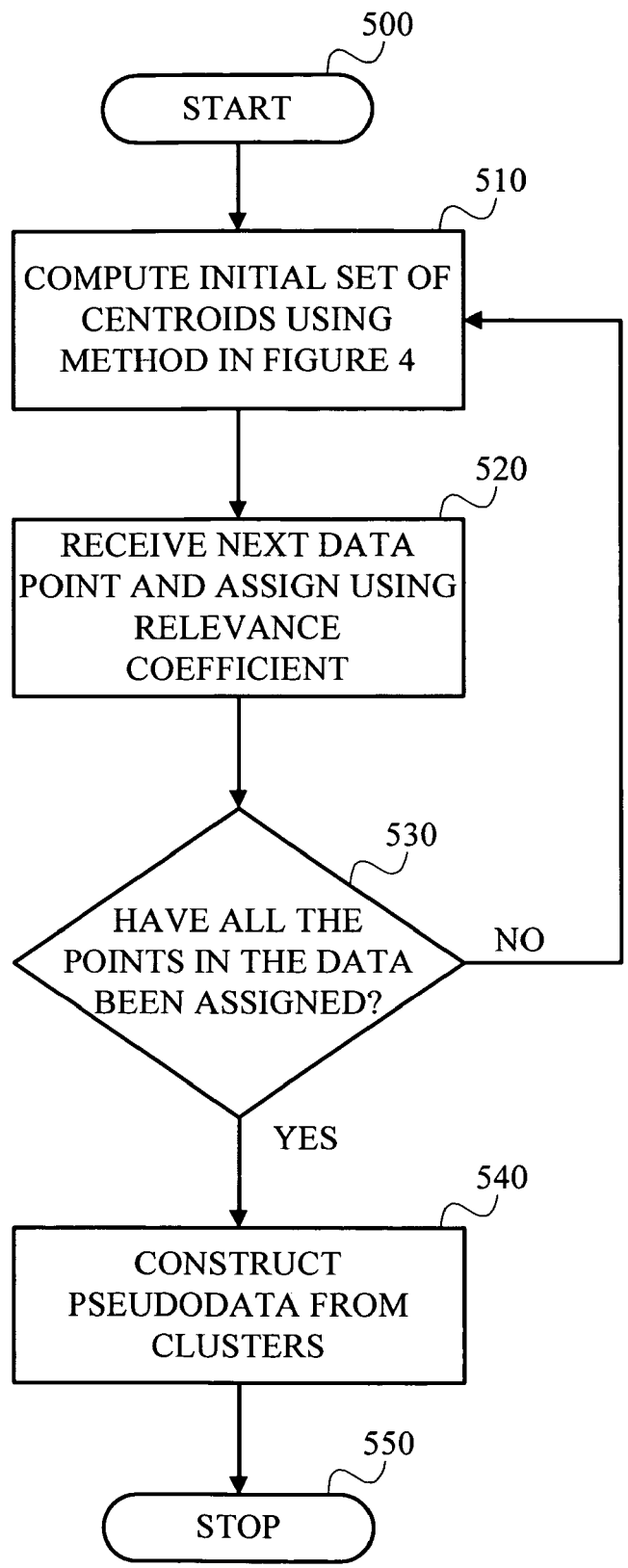
FIG. 5 is a flow diagram illustrating a methodology for achieving anonymization of a dynamic database of records using the relevance coefficients of the individual entries, according to an embodiment of the present invention.

The method described in the context of FIG. 4 is for the case of static transformations. For the case of dynamic data sets, such as data streams, it is possible to perform alternative transformations. This is illustrated in FIG. 5, in which a flow diagram illustrates a methodology for achieving anonymization of a dynamic database of records using the relevance coefficients of the individual entries, according to an embodiment of the present invention. The methodology begins at block 500.

Step 510 computes an initial set of centroids using a pre-defined initial portion of the data (similar to the method described above in the context of FIG. 4). Once this has been accomplished, the incoming data points can be processed one by one and added to one of the current sets of clusters.

The computation of the nearest cluster is performed by using a nearest neighbor calculation as in the previous case. In order to perform these nearest neighbor calculations, the relevance coefficients are used to weight the different features during the computation. The cluster statistics are updated correspondingly. As mentioned above, this is efficient to perform, since the cluster statistics are maintained in additive form. Therefore, the statistics of the current data point are simply added to the statistics of the current cluster. This is achieved in step 520. In step 530, the methodology checks whether or not all points have been assigned. Once all the points have been assigned, the methodology can generate the pseudo-data (step 540) using the same method as described above in the context of FIG. 4. The methodology ends at block 550.

Advantageously, as illustratively explained above, techniques for privacy preservation of high dimensional data records are provided. In order to perform the privacy preservation, according to illustrative embodiments of the invention, distortion of the data is computed in a way which is sensitive to the nature of the underlying data mining application. By using this technique, it is possible to ensure that the information needed for that particular application is retained effectively. This is useful in the high dimensional case since only a small number of attributes can be utilized, without encountering the disadvantages of dimensionality for that application.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of generating at least one output data set from at least one input data set for use in association with a data mining process, the input data set comprising at least one entry including each of a plurality of attributes, comprising the steps of:

determining at least one relevance coefficient for at least a subset of the plurality of attributes;

selecting at least one relevant attribute of the at least one input data set based at least in part on the at least one relevance coefficient; and generating the at least one output data set from the at least one input data set;

wherein the at least one output data set comprises at least one entry not including at least one of the plurality of attributes; and wherein the at least one entry of the output data set has the at least one relevant attribute of the at least one input data set;

wherein the at least one relevance coefficient is computed using a quantitative measure of an effect on the data mining process of a deletion of at least the given attribute from each entry of the input data set.

2. The method of claim 1, wherein the output data set is anonymized.

3. The method of claim 2, wherein the anonymization generates synthetic pseudo-data.

4. The method of claim 1, wherein the data mining process is a privacy preserving data mining process.

5. The method of claim 1, wherein the at least one input data set is multidimensional.

6. The method of claim 1, wherein a global feature analysis is used for computing the at least one relevance coefficient.

7. The method of claim 1, wherein a local feature analysis is used for computing the at least one relevance coefficient.

8. The method of claim 1, wherein the at least one relevance coefficient is used in at least one distance function during a condensation process.

9. The method of claim 8, wherein the at least one distance function is more strongly weighted by the at least one relevant attribute.

10. The method of claim 1, wherein the at least one relevant attribute is pre-selected for privacy preservation purposes.

11. Apparatus for generating at least one output data set from at least one input data set for use in association with a data mining process, the input data set comprising at least one entry including each of a plurality of attributes, the apparatus comprising:

a memory; and at least one processor coupled to the memory and operative to: (i) determine at least one relevance coefficient for at least a subset of the plurality of attributes; (ii) select at least one relevant attribute of the at least one input data set based at least in part on the at least one relevance coefficient; and (iii) generate the at least one output data set from the at least one input data set;

wherein the at least one output data set comprises at least one entry not including at least one of the plurality of attributes; and wherein the at least one entry of the output data set includes the at least one relevant attribute of the at least one input data set;

wherein the at least one relevance coefficient is computed using a quantitative measure of an effect on the data mining process of a deletion of at least the given attribute from each entry of the input data set.

12. The apparatus of claim 11, wherein the output data set is anonymized.

13. The apparatus of claim 12, wherein the anonymization generates synthetic pseudo-data.

14. The apparatus of claim 11, wherein the data mining process is a privacy preserving data mining process.

15. The apparatus of claim 11, wherein the at least one input data set is multidimensional.

16. The apparatus of claim 11, wherein a global feature analysis is used for computing the at least one relevance coefficient.

17. The apparatus of claim 11, wherein a local feature analysis is used for computing the at least one relevance coefficient.

18. The apparatus of claim 11, wherein the at least one relevance coefficient is used in at least one distance function during a condensation process.

19. The apparatus of claim 18, wherein the at least one distance function is more strongly weighted by the at least one relevant attribute.

20. The apparatus of claim 11, wherein the the at least one relevant attribute is pre-selected for privacy preservation purposes.

21. An article of manufacture for generating at least one output data set from at least one input data set for use in association with a data mining process, the input data set comprising at least one entry including each of a plurality of attributes, comprising a machine readable medium containing one or more programs which when executed implement the steps of:

determining at least one relevance coefficient for at least a subset of the plurality of attributes;

selecting at least one relevant attribute of the at least one input data set based at least in part on the at least one relevance coefficient; and generating the at least one output data set from the at least one input data set;

wherein the at least one output data set comprises at least one entry not including at least one of the plurality of attributes; and wherein the at least one entry of the output data set includes the at least one relevant attribute of the at least one input data set;

wherein the at least one relevance coefficient is computed using a quantitative measure of an effect on the data mining process of a deletion of at least the given attribute from each entry of the input data set.

* * * * *